US010388250B2

(12) United States Patent
Clawges et al.

(10) Patent No.: US 10,388,250 B2
(45) Date of Patent: Aug. 20, 2019

(54) METHODS, SYSTEMS, AND MEDIA FOR MODIFYING USER INTERFACE COLORS IN CONNECTION WITH THE PRESENTATION OF A VIDEO

(71) Applicant: Google LLC, Mountain View, CA (US)

(72) Inventors: Maegan Clawges, San Francisco, CA (US); Samuel Keene, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/490,526

(22) Filed: Apr. 18, 2017

(65) Prior Publication Data

US 2018/0301113 A1 Oct. 18, 2018

(51) Int. Cl.
G09G 5/06 (2006.01)
G06T 11/60 (2006.01)
G06T 7/90 (2017.01)
G06T 9/00 (2006.01)
G06T 11/00 (2006.01)
G06F 3/048 (2013.01)
(Continued)

(52) U.S. Cl.
CPC .............. G09G 5/06 (2013.01); G06T 5/009 (2013.01); G06T 7/90 (2017.01); G06T 11/60 (2013.01); H04N 21/431 (2013.01); H04N 21/4318 (2013.01); H04N 21/8126 (2013.01); G09G 2320/0242 (2013.01); G09G 2320/066 (2013.01); G09G 2320/0666 (2013.01); G09G 2354/00 (2013.01); H04N 5/272 (2013.01)

(58) Field of Classification Search
CPC combination set(s) only.
See application file for complete search history.

(56) References Cited

U.S. PATENT DOCUMENTS 8,407,590 B1* 3/2013 Shamis ............ G06F 17/30905
715/273
8,988,450 B1* 3/2015 Kanter ................ G06F 17/3025
345/589
(Continued)

FOREIGN PATENT DOCUMENTS

EP 2230839 9/2010
WO WO 2014130213 8/2014

OTHER PUBLICATIONS

International Search Report and Written Opinion dated May 25, 2018 in International Patent Application No. PCT/US2018/013294.

Primary Examiner — Wesner Sajous
(74) Attorney, Agent, or Firm — Byrne Poh LLP

(57) ABSTRACT

Methods, systems, and media for modifying user interface colors are provided. In some embodiments, the method comprises: receiving a video and color palette information, wherein each color of the color palette information indicates a color of an element of a user interface in which the video is to be presented; identifying a first color for the element, wherein the first color corresponds to a first portion of the video; causing the first portion of the video to be presented, wherein the element of the user interface having the first color is presented; identifying a second color for the element, wherein the second color corresponds to a second portion of the video; and modifying an appearance of the element by changing the color of the element from the first color to the second color while presenting the second portion of the video.

18 Claims, 7 Drawing Sheets

(51) Int. Cl.
*G06T 5/00* (2006.01)
*H04N 21/431* (2011.01)
*H04N 21/81* (2011.01)
*H04N 5/272* (2006.01)

(56) References Cited

U.S. PATENT DOCUMENTS

| | | |
|---|---|---|
| 2002/0018069 A1 | 2/2002 | Kim |
| 2012/0188459 A1 | 7/2012 | Madonna et al. |
| 2013/0207994 A1* | 8/2013 | Rodeski ............ G06F 17/30899 345/594 |
| 2015/0379732 A1* | 12/2015 | Sayre, III ................ G06T 7/408 382/164 |
| 2017/0228895 A1* | 8/2017 | Lee ........................ G06T 11/001 |
| 2018/0108155 A1* | 4/2018 | Lee ............................ G06T 7/90 |

* cited by examiner

|         |         |         |
|---------|---------|---------|
| FRAME 1 | FRAME 2 | FRAME 3 |
| FRAME 4 | FRAME 5 | FRAME 6 |
| FRAME 7 | FRAME 8 | FRAME 9 |

FIG. 2A

|         |         |         |
|---------|---------|---------|
| COLOR 1 | COLOR 2 | COLOR 3 |
| COLOR 4 | COLOR 5 | COLOR 6 |
| COLOR 7 | COLOR 8 | COLOR 9 |

FIG. 2B

METHODS, SYSTEMS, AND MEDIA FOR MODIFYING USER INTERFACE COLORS IN CONNECTION WITH THE PRESENTATION OF A VIDEO

TECHNICAL FIELD

The disclosed subject matter relates to methods, systems, and media for modifying user interface colors in connection with the presentation of a video.

BACKGROUND

People frequently watch videos on user devices, such as their mobile phones, tablet computers, etc. These videos are often streamed from a video sharing service to the user device. In some cases, a video is presented within a user interface that can include, for example, video player controls (e.g., a pause control, a rewind control, etc.) and/or information about the video. However, the colors of different items in the user interface are typically static, and may therefore clash with the video during the presentation of the video, which can make the viewing experience jarring to the user. In a more particular example, the static portion of a user interface can continue to conflict with the viewing experience as the scene and colors change when the video is being played back in the user interface.

Accordingly, it is desirable to provide methods, systems, and media for modifying user interface colors in connection with the presentation of a video.

SUMMARY

Methods, systems, and media for modifying user interface colors in connection with the presentation of a video are provided. In accordance with some embodiments of the disclosed subject matter, methods for modifying user interface colors in connection with the presentation of a video are provided, the methods comprising: receiving, at a user device, video data corresponding to a video content item and color palette information corresponding to the video content item, wherein the color palette information indicates a plurality of colors each corresponding to a portion of the video content item from a plurality of portions of the video content item, and wherein each color of the plurality of colors indicates a color of an element of a user interface in which the video content item is to be presented on the user device; identifying a first color for the element of the user interface based on the color palette information, wherein the first color corresponds to a first portion of the video content item; causing the first portion of the video content item to be presented within the user interface, wherein the element of the user interface having the first color is presented; identifying a second color for the element of the user interface, wherein the second color corresponds to a second portion of the video content item; and modifying an appearance of the element of the user interface by changing the color of the element from the first color to the second color while presenting the second portion of the video content item.

In accordance with some embodiments of the disclosed subject matter, systems for modifying user interface colors in connection with the presentation of a video are provided, the systems comprising: a hardware processor that is programmed to: receive, at a user device, video data corresponding to a video content item and color palette information corresponding to the video content item, wherein the color palette information indicates a plurality of colors each corresponding to a portion of the video content item from a plurality of portions of the video content item, and wherein each color of the plurality of colors indicates a color of an element of a user interface in which the video content item is to be presented on the user device; identify a first color for the element of the user interface based on the color palette information, wherein the first color corresponds to a first portion of the video content item; cause the first portion of the video content item to be presented within the user interface, wherein the element of the user interface having the first color is presented; identify a second color for the element of the user interface, wherein the second color corresponds to a second portion of the video content item; and modify an appearance of the element of the user interface by changing the color of the element from the first color to the second color while presenting the second portion of the video content item.

In accordance with some embodiments of the disclosed subject matter, non-transitory computer-readable media containing computer executable instructions that, when executed by a processor, cause the processor to perform a method for modifying user interface colors in connection with the presentation of a video are provided. The methods comprise: receiving, at a user device, video data corresponding to a video content item and color palette information corresponding to the video content item, wherein the color palette information indicates a plurality of colors each corresponding to a portion of the video content item from a plurality of portions of the video content item, and wherein each color of the plurality of colors indicates a color of an element of a user interface in which the video content item is to be presented on the user device; identifying a first color for the element of the user interface based on the color palette information, wherein the first color corresponds to a first portion of the video content item; causing the first portion of the video content item to be presented within the user interface, wherein the element of the user interface having the first color is presented; identifying a second color for the element of the user interface, wherein the second color corresponds to a second portion of the video content item; and modifying an appearance of the element of the user interface by changing the color of the element from the first color to the second color while presenting the second portion of the video content item.

In accordance with some embodiments of the disclosed subject matter, systems for modifying user interface colors in connection with the presentation of a video are provided, the systems comprising: means for receiving, at a user device, video data corresponding to a video content item and color palette information corresponding to the video content item, wherein the color palette information indicates a plurality of colors each corresponding to a portion of the video content item from a plurality of portions of the video content item, and wherein each color of the plurality of colors indicates a color of an element of a user interface in which the video content item is to be presented on the user device; means for identifying a first color for the element of the user interface based on the color palette information, wherein the first color corresponds to a first portion of the video content item; means for causing the first portion of the video content item to be presented within the user interface, wherein the element of the user interface having the first color is presented; means for identifying a second color for the element of the user interface, wherein the second color corresponds to a second portion of the video content item; and means for modifying an appearance of the element of the user interface by changing the color of the element from the first color to the second color while presenting the second portion of the video content item.

In some embodiments, the element is an overlay graphic that is positioned to be presented over the presentation of the video content item within the user interface.

In some embodiments, the color palette information includes blending information that indicates a presentation mode in which the overlay graphic is to be presented in connection with the video content item.

In some embodiments, the systems further comprise: means for determining that the user device does not have a capability to blend the overlay graphic with the first portion of the video content item; in response to the means for determining that the user device does not have the capability to blend the overlay graphic with the first portion of the video content item, means for applying a transparency value to the first portion of the video content item.

In some embodiments, the systems further comprise means for creating a composite first portion of the video content item by blending the overlay graphic with the first portion of the video content item using the blending information, wherein causing the first portion of the video content item to be presented comprises causing the composite first portion of the video content item to be presented.

In some embodiments, the color palette information includes contrast information that indicates a contrast ratio of text of the element of the user interface to a background color of the element of the user interface.

In some embodiments, the color palette information includes an idle color for the element of the user interface when the user interface is determined to be in an idle state and an active color for the element of the user interface when the user interface is determined to be in an active state.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 2A and 2B show illustrative examples of schematic diagrams for generating color palettes for multiple frames of a video in accordance with some embodiments of the disclosed subject matter.

DETAILED DESCRIPTION

Figure 1:
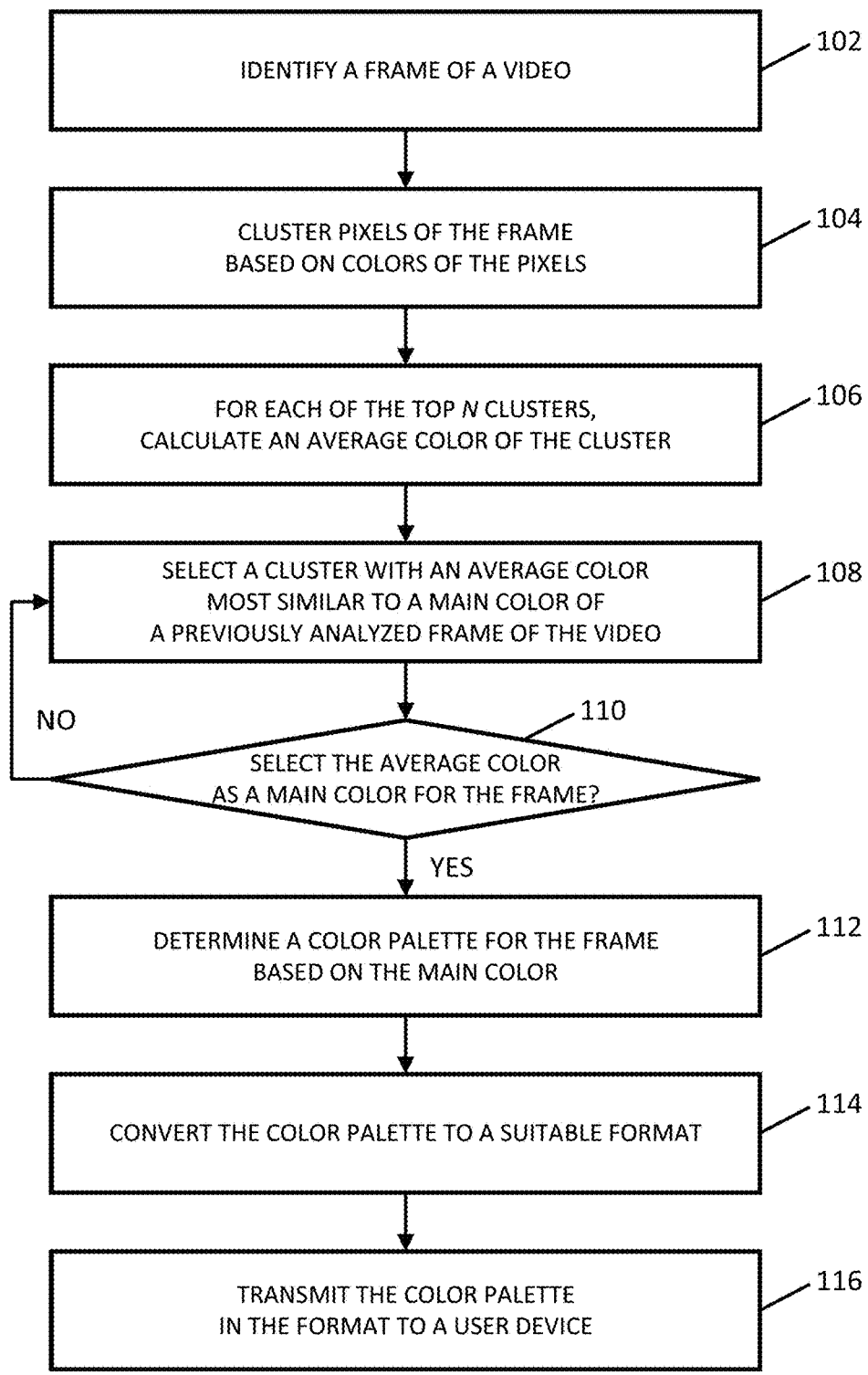
FIG. 1 shows an example of a process for generating a color palette for a frame of a video in accordance with some embodiments of the disclosed subject matter.

In accordance with various embodiments, mechanisms (which can include methods, systems, and media) for modifying user interface colors in connection with the presentation of a video are provided.

In some embodiments, the mechanisms described herein can identify content color data that describes one or more colors of the content appearing in a frame of a video. For example, in some embodiments, the content color data can indicate a dominant color of the frame or a color that appears most frequently within content of the video during that frame. In some embodiments, the mechanisms can then generate a color palette based on the identified content color data. For example, in some embodiments, the color palette can indicate a color of various portions of a user interface in which the video is presented on a user device, such as a section indicating information about the video, colors of video player controls, colors of graphical overlays superimposed on presentation of the video content item, and/or any other suitable portions of the user interface. In some embodiments, the mechanisms described herein can repeat the content color data identification and color palette generation for multiple frames of the video (e.g., frames that are one second apart throughout the video, and/or any other suitable frames). The mechanisms can then transmit the color palette information for the frames to a user device that requested the video for presentation, thereby allowing the user device to use the color palette information to dynamically change a color scheme of one or more user interface elements in which the video is presented during presentation of the video.

In some embodiments, the mechanisms can determine the content color data using any suitable technique or combination of techniques. For example, in some embodiments, the mechanisms can cluster pixels within a frame based on a color of each pixel, and can identify the cluster having the most pixels. In another example, in some embodiments, the mechanisms can cluster pixels within a particular area of a frame by grouping or connecting pixels within a particular color range and can identify the color range or color ranges having a number of pixels greater than a particular threshold number of pixels. The mechanisms can then determine that a main color or a dominant color for the frame is the average color, or other suitable combination, of the pixels within the cluster having the most pixels or the average color, or other suitable combination, of the pixels within the cluster or clusters having a number of pixels greater than a threshold number of pixels.

In some embodiments, the mechanisms described herein can modify a user interface and/or user interface elements on a user device in which a video content item is presented based on the color palette information that describes the color of content being presented in the video content item. For example, in some embodiments, a server that determines color palettes corresponding to different frames of the video content item can transmit the color palette information to the user device in response to a request from the user device to present the video content item. In some embodiments, the user device can then use the color palette information to modify attributes of the user interface during presentation of the video content item. For example, in some embodiments, the user device can set initial user interface parameters (e.g., colors of video player controls, colors of sections of the user interface presenting information about the video, colors of overlays superimposed on presentation of the video content item, and/or any other suitable parameters) for a first portion of the video content item (e.g., a first second of the video, and/or any other suitable first portion) based on first color palette information (e.g., a first set of values, and/or any other suitable information). The user device can then modify the user interface parameters based on second color palette information (e.g., a second set of values, and/or any other suitable information) that corresponds to a second portion of the video content item while continuing to present the video content item within the user interface.

In some embodiments, the mechanisms described herein can accelerate processing by a processing unit of a user device presenting the video content item. For example, in some embodiments, processing by a Graphics Processing Unit (GPU) of the user device can be accelerated by blending user interface elements using the color palette information with the video content item. Additionally, by transmitting the color palette information in a computer-readable format, such as an array of color values where each color value corresponds to a different segment of the video content item, the color palette information can be transmitted without requiring much additional bandwidth relative to the bandwidth required to transmit the video content item to the user device. Furthermore, by transmitting the color palette information as an array of color values, individual user devices that receive the color palette information can modify the color palette information in any suitable manner in modifying colors of the user interface elements. For example, in some embodiments, an individual user device that receives a video content item from a server with corresponding color palette information can modify transparency values associated with a color for a particular user interface element, and/or modify color values in any other suitable manner. In another example, in some embodiments, a user device executing a first media playback application to present a video content item can apply the color palette information differently than the same user device executing a second media playback application to present the video content item. In yet another example, in some embodiments, a user device can apply the color palette information on a user interface presented by a media playback application differently than a different user device executing the same media playback application to present the user interface for presenting the video content item (e.g., based on device capabilities, based on device preferences, etc.).

Turning to FIG. 1, an example 100 of a process for color palette extraction for frames of a video is shown in accordance with some embodiments of the disclosed subject matter. In some embodiments, the blocks of process 100 can be implemented on one or more servers, as shown in and described below in connection with FIG. 3.

In some embodiments, process 100 can begin at 102 by identifying a frame of a video for analysis. In some embodiments, the frame can be chosen in any suitable manner. For example, in some embodiments, the frame can be a first frame of the video. As another example, in some embodiments, process 100 can loop through the video and identify every Nth frame for analysis (e.g., every tenth frame, every twentieth frame, and/or any other suitable frame). As a more particular example, in some embodiments, process 100 can identify one frame that represents any suitable duration of time of the video (e.g., one second, two seconds, and/or any other suitable duration). As a specific example, if the frame rate of the video is 10 frames per second, and process 100 identifies one frame that represents a second of the video, process 100 can identify every tenth frame for analysis. As yet another more particular example, in some embodiments, process 100 can identify particular frames for analysis based on any suitable criterion, such as a particular object appearing in the frame, a particular color threshold being met (e.g., such that initial frames including black space is not submitted for analysis), etc.

At 104, in some embodiments, process 100 can cluster pixels of the identified frame based on colors of the pixels. In some embodiments, process 100 can cluster the pixels into any suitable number of pixels (e.g., two, five, ten, and/or any other suitable number). Note that, in some embodiments, the number of clusters can vary based on any suitable information (e.g., a genre of the video content item, a resolution of the video content item, and/or any other suitable information). In some embodiments, process 100 can cluster the pixels of the identified frame using any suitable technique or combination of techniques. For example, in some embodiments, process 100 can cluster the pixels using a group of thresholds corresponding to each cluster. As a more particular example, in some embodiments, process 100 can compare color values (e.g., hue, saturation, and value, or HSV, parameters for each pixel, and/or any other suitable values) for a pixel to predetermined threshold values corresponding to different clusters to assign the pixel to a particular cluster. As a specific example, process 100 can determine that a pixel with a hue parameter between 26 degrees and 52 degrees, a saturation parameter between 0.3 and 0.6, and a value parameter between 0.3 and 0.6 is to be assigned to a first cluster. As another example, in some embodiments, process 100 can use any suitable statistical classification or machine learning technique(s) to cluster the pixels (e.g., a K-nearest neighbors algorithm, and/or any other suitable clustering algorithm).

At 106, in some embodiments, upon obtaining multiple clusters of pixels, process 100 can calculate an average color for each cluster in the top N clusters with the most pixels assigned to the cluster. For example, in an instance where process 100 clustered the pixels into ten clusters at block 104, N can be any suitable number less than ten (e.g., three, five, and/or any other suitable number). In some embodiments, process 100 can rank the clusters from block 104 based on the number of pixels assigned to each cluster and can calculate the average color for each of the N top-ranked clusters. In some embodiments, process 100 can calculate an average color using any suitable technique or combination of techniques. For example, in some embodiments, process 100 can average individual components of a color indicating scale (e.g., Red, Green, Blue, or RGB, values, HSV values, and/or any other suitable color indicating scale). As a more particular example, in instances where colors are indicated using RGB values, process 100 can calculate the average color by averaging all R values for all of the pixels in the cluster, all G values for all of the pixels in the cluster, and all B values for all of the pixels in the cluster, and calculating the average color as the color resulting from the average R, G, and B values. In some embodiments, process 100 can discard one or more pixels that have been determined as likely to be outliers, for example, black pixels in the middle of a group of non-black pixels, pixels that are similar to particular colors (e.g., similar to and/or close to white, similar to and/or close to black, similar to and/or close to particular shades of yellow, and/or any other suitable colors or shades), and/or any other suitable pixels. For example, in instances where process 100 discards pixels that are white or similar to white and where color information is stored in an RGB format, process 100 can discard any pixels with color information within a predetermined range of (255, 255, 255), such as pixels with red, green, and blue pixels above a predetermined threshold (e.g., above 250, above 220, and/or any other suitable threshold).

In some embodiments, process 100 can select a cluster of the top N clusters with an average color most similar to content color data of a previously analyzed frame at 108. For example, in some embodiments, process 100 can select the cluster with an average color most similar to a main color or dominant color of a frame corresponding to the previous second of video. As another example, in some embodiments, process 100 can select the cluster with an average color most similar to a main color or dominant color of the frame that was previously analyzed by process 100. In some embodiments, process 100 can determine similarity of the average colors of the clusters to the content color data of the previous frame using any suitable technique or combination of techniques. For example, in some embodiments, process 100 can calculate a distance metric (e.g., a Euclidean distance, and/or any other suitable distance metric) of the average color of each of the top N clusters and the main color of the previous frame, and can select the cluster with the lowest distance metric.

Note that, in some embodiments, process 100 can select the main color or the dominant color of the first frame using any suitable technique or combination of techniques. For example, in some embodiments, process 100 can use the clustering technique described above in connection with block 104 to partition the first frame into any suitable number of clusters, and can use the technique described above in connection with block 106 to determine an average color of each of the clusters. In some embodiments, process 100 can select the main color or the dominant color of the first frame based on the average colors of the clusters. For example, in some embodiments, process 100 can select the main color or the dominant color to be the average color of the largest cluster. As another example, in some embodiments, process 100 can select the main color or the dominant color to be the average color of a cluster in a particular spatial region of the first frame. As a more particular example, in some embodiments, process 100 can select the main color or the dominant color to be the average color of a cluster that spans at least a center portion of the first frame.

At 110, in some embodiments, process 100 can determine whether the selected average color determined to be most similar to content color data of a previously analyzed frame is to be selected as the content color data of the frame currently being analyzed. For example, in some embodiments, process 100 can determine whether the selected average color is to be selected as a main color or dominant color of the frame currently being analyzed. Process 100 can determine whether to select the average color based on any suitable information. For example, in some embodiments, process 100 can determine that the average color is not to be selected as the content color data of the current frame if the average color is similar to a particular color and/or shade of color (e.g., a particular shade of yellow, a particular shade of orange, and/or any other suitable particular color or shade). In some embodiments, process 100 can determine that the average color is to be selected as content color data of the current frame as a default. Note that, in some embodiments, process 100 can make any suitable modifications to the average color prior to setting the average color to be the content color data of the current frame. For example, in some embodiments, process 100 can adjust a saturation and/or a brightness level of the average color. As a more particular example, in instances where the average color is yellow and/or similar to yellow, process 100 can adjust a saturation and/or a brightness value associated with the average color to be below a predetermined threshold (e.g., below 65, below 80, and/or any other suitable value). In some embodiments, process 100 can preferentially select particular colors as the content color data based on any suitable information. For example, in some embodiments, process 100 can determine that the selected content color data is to be a shade of a particular color (e.g., red, blue, green, and/or any other suitable color) based on an entity associated with a service providing the video content item. As a more particular example, process 100 can determine that the selected content color data is to be a shade of red if a first video sharing service or social networking service is providing the video content item and can determine that the selected content color data is to be a shade of blue if a second video sharing service or social networking service is providing the video content item.

Note that, in some embodiments, process 100 can process multiple frames of the video at once. For example, in some embodiments, process 100 can generate a mosaic representing multiple frames of the video spanning any suitable duration of the video, as shown by mosaic 200 of FIG. 2A. For example, in some embodiments, mosaic 200 can have any suitable number of frames (e.g., 4, 9, 25, and/or any other suitable number), where each frame represents any suitable portion of the video. As a more particular example, in some embodiments, each frame can be one second apart in the video, and a mosaic with, for example, 25 frames can therefore represent 25 seconds of the video. In some embodiments, process 100 can then identify content color data (e.g., a main color and/or a dominant color of the frame, and/or any other suitable content color data) for each frame in mosaic 100, using the techniques described above in connection with blocks 104-110. Process 100 can then generate a color mosaic 250 that indicates content color data for each frame in mosaic 100. Color mosaic 250 can therefore indicate, in one mosaic, content color data for multiple frames of the video.

It should be noted that mosaic 200 of FIG. 2A is merely illustrative and can be presented in any suitable manner. For example, each analyzed frame can be presented in a mosaic configuration and, within each presented frame, the determined color content data can be concurrently presented in a portion of the frame (e.g., an area containing the determined color content data in a corner of the frame). In another example, each analyzed frame can be blended, or otherwise combined, with the determined color content data in the presented mosaic.

If, at block 110, process 100 determines that the average color is not to be selected as the content color data of the current frame ("no" at 110), process 100 can loop back to 108 and select an average color of a different cluster. For example, process 100 can determine that a cluster having the next highest number of pixels is used to determine the color content data.

If, at block 110, process 100 determines that the average color is to be selected as the content color data of the current frame ("yes" at 110), process 100 can proceed to block 112 and can determine a color palette for the current frame based on the content color data. In some embodiments, the color palette can specify colors for any suitable portions of a user interface in which the video content item is being presented. For example, as shown in user interface 500 of FIG. 5, the color palette can specify colors for different sections 504 of user interface 500 in which video 502 is being presented. As a more particular example, individual sections within sections 504 can each indicate different types of information, such as information about the video (e.g., a name of the creator, a number of views of the video, and/or any other suitable information), comments from viewers of the video, recommended videos determined to be similar to the video, and/or any other suitable information. In some embodiments, each section of sections 504 can be presented in a text and with a background color based on the content color data selected at block 110. Additionally, in some embodiments, the color palette can indicate colors of any suitable user interface navigation components, as indicated in navigation panel 506, such as video player controls (e.g., a pause control, a rewind control, a video frame navigation control, and/or any other suitable controls). In some embodiments, the color palette can assign colors to particular user interface elements based on a state of the user interface. For example, the color of a user interface control when the user interface is determined to be in an active state (e.g., when a cursor is hovered in a particular position within user interface 500, when a particular portion of user interface 500 is active, and/or based on any other suitable determination) can be different than the color of the user interface control when the user interface is determined to be in an idle state, as shown in user interface 500.

Figure 5:
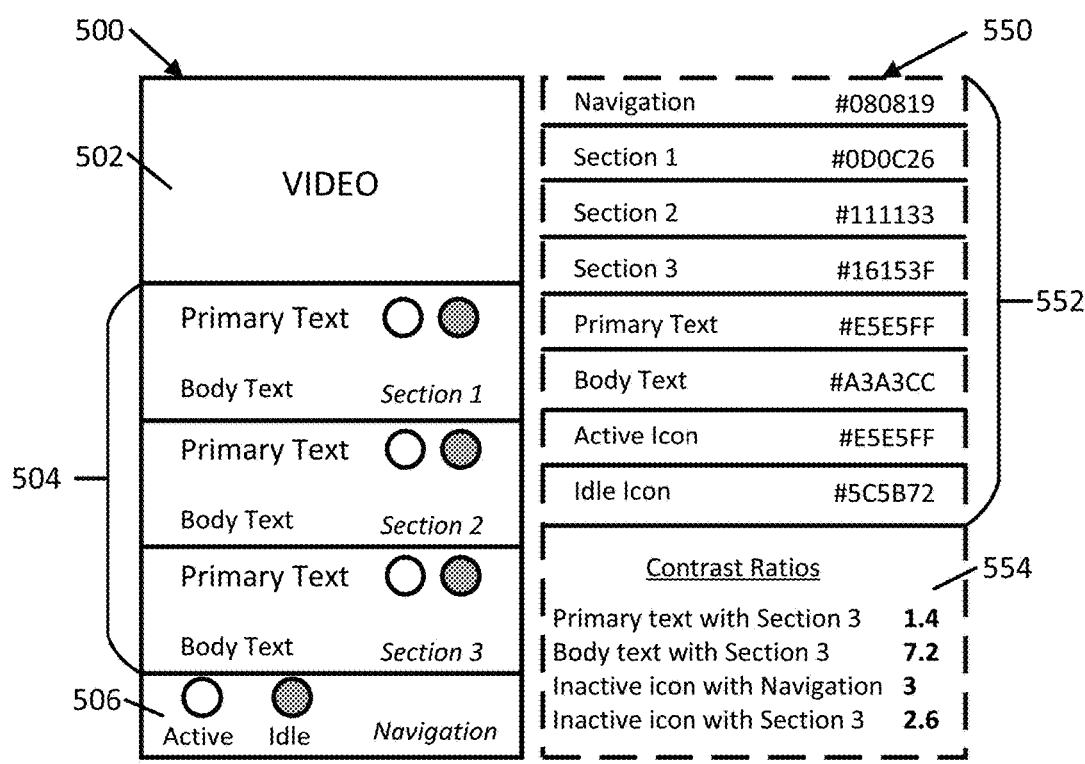
FIG. 5 shows an example of a user interface for presenting a video content item based on a determined color palette in accordance with some embodiments of the disclosed subject matter.

In some embodiments, process 100 can determine the colors of the color palette in any suitable format, as shown in schematic 550. For example, in some embodiments, process 100 can identify a color for each type of content in content types 552. In some embodiments, the colors in the color palette can be in any suitable format, for example, in hexadecimal values as shown in FIG. 5, and/or in any other suitable format (e.g., HSV values, RGB values, and/or any other suitable format). Additionally, as shown in FIG. 5, the color palette information can include any other suitable information, such as contrast ratios between different types of content. For example, as shown in FIG. 5, the color palette information can indicate a contrast ratio for a user interface icon in an idle state with text in a particular section of user interface 500.

Note that, in some embodiments, process 100 can determine multiple color palettes, for example, corresponding to different themes based on the content color data. For example, in some embodiments, process 100 can determine a first color palette corresponding to a dark theme, a second color palette corresponding to a light theme, and a third color palette corresponding to a vibrant theme. As a more particular example, in some embodiments, the first color palette corresponding to the dark theme can contain background colors that are generally darker than corresponding colors in the light theme and the vibrant theme. In some embodiments, a first color palette (e.g., corresponding to a dark theme) can be generated, and other color palettes corresponding to other themes (e.g., light, vibrant, and/or any other suitable themes) can be generated based on the first color palette, for example, by decreasing color values by a predetermined percentage (e.g., by 5%, by 10%, and/or by any other suitable percentage) for each theme. In some embodiments, each of the first color palette, second color palette, and third color palette can have different contrast ratios based on background text colors and text colors for each color palette. For example, in some embodiments, the contrast ratios can be set such that text when appearing superimposed on a background of a particular color is generally readable (e.g., complies with any suitable accessibility standards, and/or meets any other suitable standards).

In some embodiments, process 100 can loop through the video and determine color palette information for multiple frames or groups of frames (e.g., using mosaics as described above in connection with FIG. 2) for the video content item. For example, in instances where process 100 analyzes every ten frames of the video, process 100 can process the subsequent frame in the sequence of frames. In some embodiments, process 100 can store color palette information for each frame or portion of the video in an array, and can store the aggregated color palette information in any suitable format, such as an array of arrays.

Process 100 can convert the color palette to any suitable format at block 114. For example, in some embodiments, process 500 can convert individual color palette values (e.g., a color of a background of a particular section, a color of a navigation control in an active state, and/or any other suitable color palette values) in a hexadecimal format to equivalent values in an RGB format. In some embodiments, process 100 can use any suitable equations and or transformation algorithms to convert the color palette values to the suitable format. In some embodiments, process 100 can select the format type based on a type of user device which the color palette values are to be sent to. Additionally or alternatively, in some embodiments, process 100 can convert the color palette values to multiple formats to be suitable for multiple device types. In some embodiments, process 100 can indicate any other suitable information in the color palette for each frame, such as an opacity/transparency associated with each item in the color palette. In some embodiments, the opacity/transparency value can have a default value (e.g., 1 indicating a fully opaque element, and/or any other suitable value), and the value can be modified by a user device when rendering the video content item in accordance with the color palette.

Note that, in some embodiments, process 100 can convert the color palette to a particular format based on a platform of a user device that is to receive the color palette information. For example, in some embodiments, process 100 can convert the color palette to a first format for user devices that are desktop computers, a second format for user devices that are mobile devices, and a third format for user devices that are smart televisions.

In some embodiments, process 100 can transmit the color palette to a user device at 116. In some embodiments, the user device can be any suitable user device, such as a user device that requested the video content item from a server hosting the video. In some embodiments, process 100 can transmit multiple color palettes, where each color palette corresponds to a subset of frames (e.g., one frame of the video, one second of the video, and/or any other suitable subset) of the video. Additionally, in some embodiments, multiple color palettes, each corresponding to a different theme (e.g., dark, light, vibrant, and/or any other suitable theme) can be transmitted to the user device.

In some embodiments, the user device can then use the received color palette(s) to dynamically modify a user interface in which the video is being presented during presentation of the video. For example, in some embodiments, colors of video player controls can be modified to correspond to an average color of a particular subset of the video during presentation of that subset of the video. As another example, in some embodiments, colors of sections of the user interface can be modified to correspond to an average color of a particular subset of the video during presentation of that subset of the video.

Figure 3:
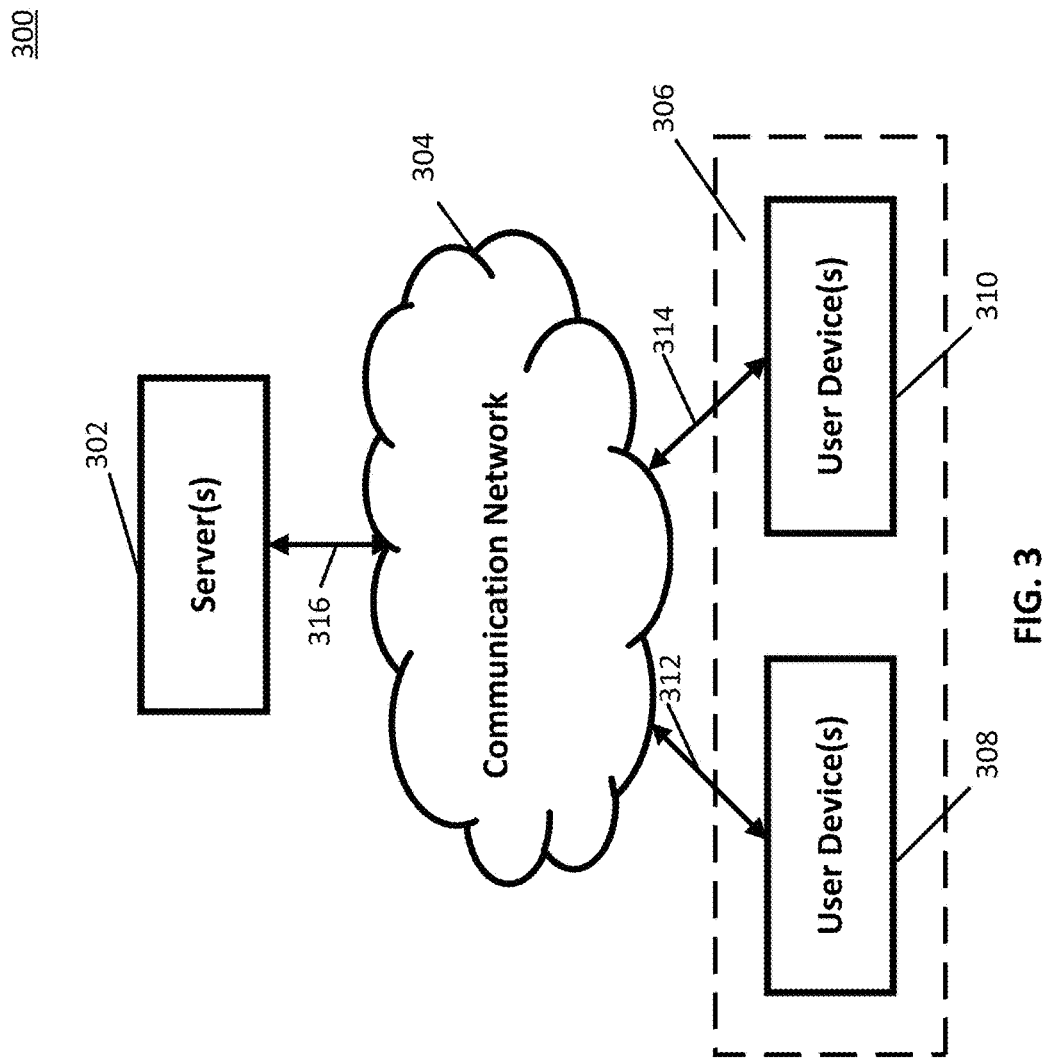
FIG. 3 shows a schematic diagram of an illustrative system suitable for implementation of mechanisms described herein for generating color palettes for videos in accordance with some embodiments of the disclosed subject matter.

Turning to FIG. 3, an example of an illustrative system 300 suitable for implementation of mechanisms described herein for color palette extraction for videos is shown in accordance with some embodiments of the disclosed subject matter is shown. As illustrated, hardware 300 can include one or more servers, such as a server 302, a communication network 304, and/or one or more user devices 306, such as user devices 308 and 310.

In some embodiments, server(s) 302 can be any suitable server(s) for identifying color palettes for different frames of a video. For example, in some embodiments, server(s) 302 can identify content color data such as a main color or a dominant color for a particular frame of the video and can identify a palette of colors that can be used in different user interface contexts when presenting the video based on the content color data, as shown in and described above in connection with FIG. 1. Note that, in some embodiments, the content color data of the frame can be calculated on a first server (e.g., an image server) and the color palette can be determined on a second server (e.g., a server that hosts and/or transmits the video to user devices 306). In some embodiments, server(s) 302 can identify the content color data in any suitable manner, for example, by clustering pixels of the frame based on color and identifying an average color for each pixel, as described above in connection with FIG. 3.

Communication network 304 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links 312 to communication network 304 that can be linked via one or more communications links (e.g., communications link 314) to server(s) 302. Communications links 312 and/or 314 can be any communications links suitable for communicating data among user devices 306 and server(s) 302 such as network links, dial-up links, wireless links, hard-wired links, any other suitable communications links, or any suitable combination of such links.

In some embodiments, user devices 306 can include one or more computing devices suitable for presenting a video content item, receiving color palette information from server(s) 302, presenting user interface controls in accordance with the received color palette information, and/or any other suitable functions. For example, in some embodiments, user devices 306 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 306 can be implemented as a non-mobile device such as a desktop computer, a set-top box, a television, a streaming media player, a game console, and/or any other suitable non-mobile device.

Although server 302 is illustrated as a single device, the functions performed by server 302 can be performed using any suitable number of devices in some embodiments. For example, in some embodiments, the functions performed by server 302 can be performed on a single server. As another example, in some embodiments, multiple devices can be used to implement the functions performed by server 302.

Although two user devices 308 and 310 are shown in FIG. 3, any suitable number of user devices, and/or any suitable types of user devices, can be used in some embodiments.

Figure 4:
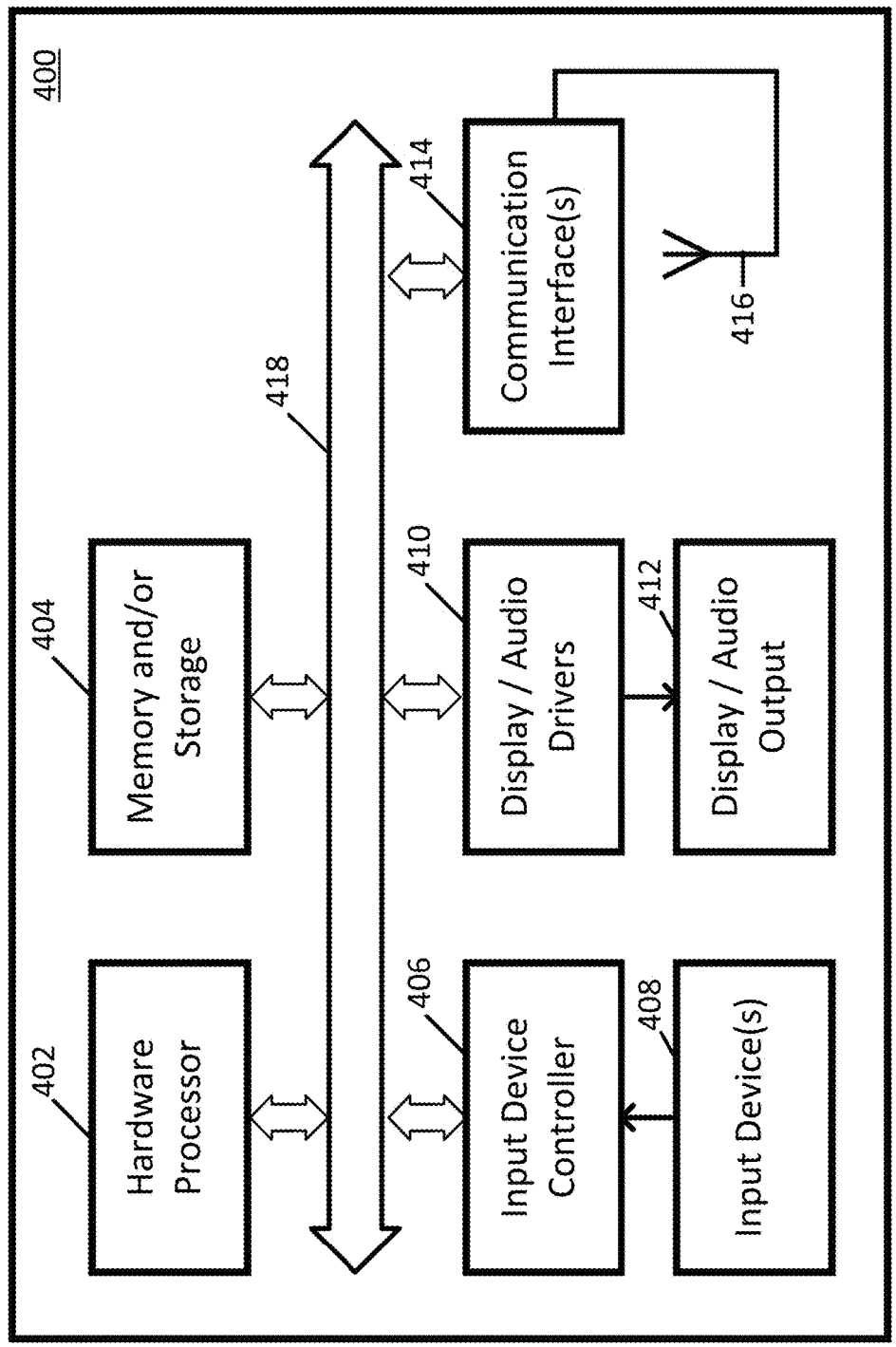
FIG. 4 shows a detailed example of hardware that can be used in a server and/or a user device of FIG. 3 in accordance with some embodiments of the disclosed subject matter.

Server(s) 302 and user devices 306 can be implemented using any suitable hardware in some embodiments. For example, in some embodiments, devices 302 and 306 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, message interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage 404 of a server (e.g., such as server 302). For example, the server program can cause hardware processor 402 to analyze frames of a video to determine a main color for each frame, determine a color palette for each frame based on the main color of the frame, transmit the color palette information to user devices in connection with transmission of the video, and/or perform any other suitable actions. In some embodiments, hardware processor 402 can be controlled by a computer program stored in memory and/or storage 404 of user device 306. For example, the computer program can cause hardware processor 402 to present a video content item, present user interface controls in connection with the received video content item in accordance with received color palette information, and/or perform any other suitable actions.

Memory and/or storage 404 can be any suitable memory and/or storage for storing programs, data, media content, advertisements, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device. In another example, input device controller 406 can be circuitry for receiving input from a head-mountable device (e.g., for presenting virtual reality content or augmented reality content).

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

Figure 6:
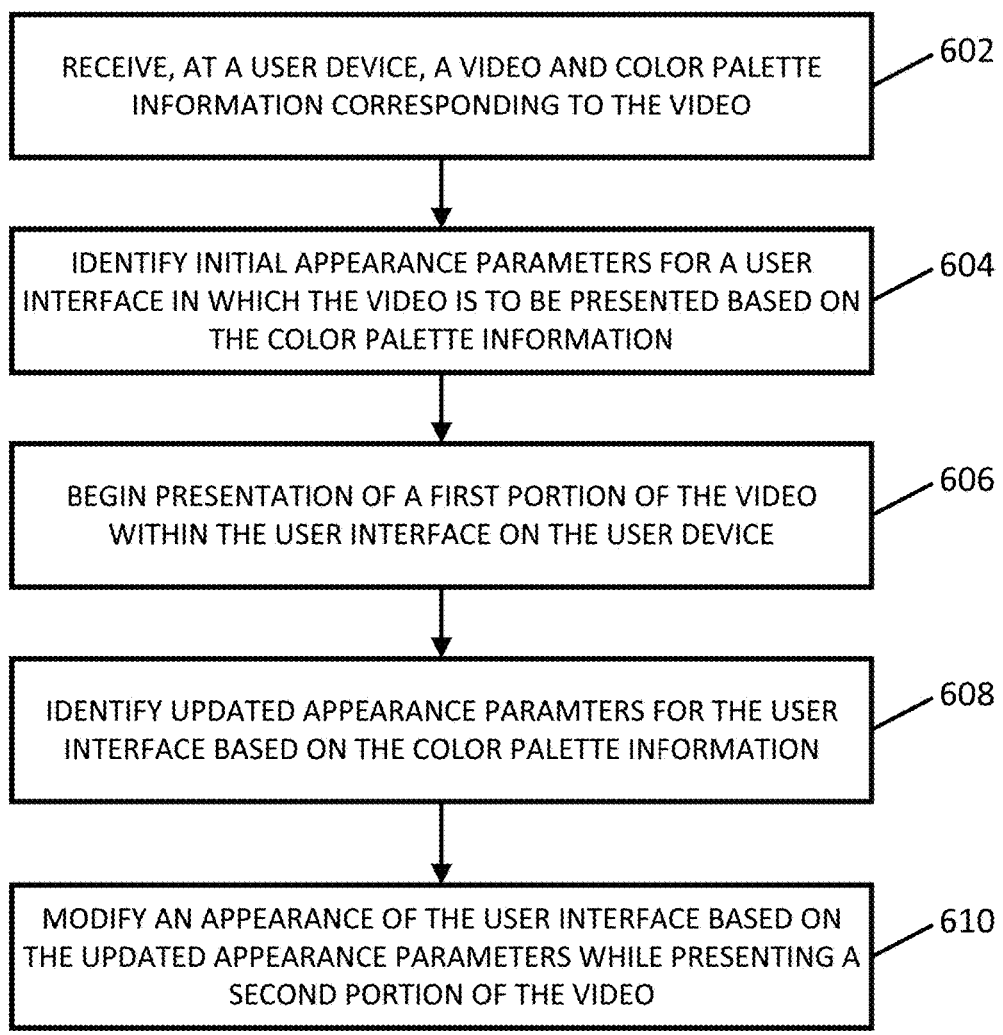
FIG. 6 shows an example of a process for modifying an appearance of a user interface based on a color palette associated with a video content item in accordance with some embodiments of the disclosed subject matter.

Turning to FIG. 6, an illustrative example 600 of a process for modifying an appearance of a user interface while presenting a video content item is shown in accordance with some embodiments of the disclosed subject matter. In some embodiments, blocks of process 600 can be implemented on a user device, such as a user device that transmits a request for a video content item from a server that hosts and/or streams video content items, as shown in and described above in connection with FIG. 3.

In some embodiments, process 600 can begin by receiving, at a user device, a video content item and color palette information corresponding to the video at 602. In some embodiments, the user device can receive the video content item and the color palette information in response to a request for the video content item. For example, in some embodiments, the user device can transmit a request for the video content item in response to receiving, from a user of the user device, a selection of an identifier of the video content item for presentation on the user device. In some embodiments, the color palette information can be received in any suitable format. For example, in some embodiments, the color palette information can be received as an array of arrays or a matrix, where a first dimension corresponds to a particular frame of the video content item and a second dimension corresponds to color palette information for the particular frame. As a more particular example, in some embodiments, the second dimension can include color information in any suitable format (e.g., RGB values, HSV values, hexadecimal values, and/or any other suitable values) for different portions of a user interface in which the video content item is presented. Additionally, in some embodiments, the color palette information can include multiple color palettes each corresponding to a different theme (e.g., a dark theme, a light theme, a vibrant theme, and/or any other suitable theme).

In some embodiments, process 600 can identify initial appearance parameters for the user interface based on the color palette information at 604. For example, as described above, the initial appearance parameters can include colors for different sections or components of the user interface. As a more particular example, the parameters can include a first color for video player controls of the user interface when in an active state (e.g., when the video player is tapped, clicked or otherwise selected) and a second color for the video player controls of the user interface when in an idle state (e.g., when the video player has not been selected in more than a predetermined duration of time). As another more particular example, in some embodiments, the parameters can include colors for different sections of the user interface, for example, a first color for a first section of the user interface that provides information about the video content item, a second color for a second section of the user interface that provides recommendations of other videos to a user of the user interface, etc. As yet another more particular example, in some embodiments, the parameters can include colors for graphic overlays (e.g., graphics that indicate a selectable input to view other video content items created by the creator of the video content item, graphics that indicate a channel or group of videos associated with the video content item, and/or any other suitable graphic overlays) presented over the video content item during presentation of the video content item. In instances where the color palette information is transmitted to the user device as an array of arrays or matrix, in some embodiments, process 600 can identify the color palette information corresponding to a particular frame or portion of the video content item based on information associated with the first dimension of the array of arrays.

Figure 7:
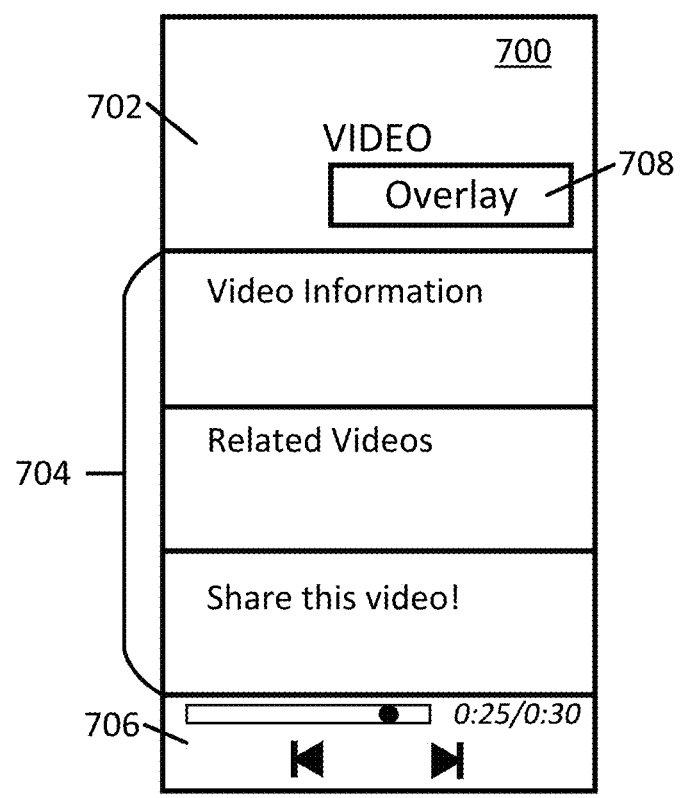
FIG. 7 shows an example of a user interface for presenting a video content item with an appearance updated based on color palette information in accordance with some embodiments of the disclosed subject matter.

FIG. 7 shows an example 700 of a user interface for presenting a video content item. As illustrated, a video content item 702 can be presented within user interface 700, and sections 704 can each present different information related to video 702 (e.g., information about video content item 702, indications of video content items similar to or related to video content item 702, indications of video content items that are to be played after video content item 702 finishes, selectable inputs to share video content item 702 on social networking sites, and/or any other suitable information). Additionally, user interface 700 can include video player window controls 706, such as rewind and fast-forward controls, and navigation information that indicates a duration of the video content item that remains or has already been presented. In some embodiments, an overlay 708 can be presented that is superimposed on video content item 702. For example, in some embodiments, overlay 708 can indicate information relating to a creator of video content item 702 (e.g., indications of other videos by the creator, indications of a channel of video content items associated with the creator, and/or any other suitable information), captions, and/or any other suitable information. In some embodiments, overlay 708 can include any suitable content, such as text, graphics, icons, animations, links, and/or any other suitable content. Additionally, in some embodiments, overlay 708 can be selectable, and selection of overlay 708 can cause, for example, a browser window in which user interface 700 is presented to navigate to a different page. In some embodiments, overlay 708 can be overlaid on video content item 702 in any suitable manner. For example, in some embodiments, overlay 708 can be blended with underlying video content item 702, as described below in connection with block 606.

Note that, in some embodiments, the color palette information can additionally include any other suitable information, such as contrast information that indicates a contrast ratio of text of a particular section with a background color of the section, font size or style information for text presented in a particular section, and/or any other suitable information. Additionally, in some embodiments, the information can be selected to conform to any suitable guidelines (e.g., accessibility guidelines, style guidelines, and/or any other suitable guidelines). For example, in some embodiments, a contrast ratio can be selected that exceeds a predetermined threshold based on accessibility guidelines.

In some embodiments, process 600 can begin presentation of a first portion of the video content item within the user interface on the user device at 606. In some embodiments, the first portion of the video content item can span any suitable duration of time (e.g., a half of a second, one second, two seconds, and/or any other suitable duration) and can be composed of any suitable number of frames (e.g., ten frames, twenty frames, thirty frames, and/or any other suitable number). Process 600 can present the first portion of the video content item in any suitable manner. For example, in some embodiments, process 600 can cause a video player window to be opened within the user interface and can cause the video content item to begin being presented within the video player window. As a more particular example, in some embodiments, process 600 can cause colors of the video player controls to be those specified by the color palette information. Note that, in instances where the color palette information includes multiple palettes each corresponding to a different theme, process 600 can select a theme based on any suitable information. For example, in some embodiments, process 600 can select the theme based on user preferences (e.g., entered via a settings interface, and/or obtained in any other suitable manner). As another example, in some embodiments, process 600 can select the theme based on any other suitable information, such as a time of day, where a particular theme (e.g., a vibrant theme) is selected for use during particular times of day (e.g., between 8 a.m. and 10 p.m., and/or any other suitable times of day) and a different theme (e.g., a dark theme) is selected for other times of day.

In some embodiments, process 600 can use any suitable technique or combination of techniques to render user interface components that are overlays over presentation of the video content item. For example, in some embodiments, process 600 can use any suitable blend modes to render the user interface components overlaid on the video content item. As a more particular example, in some embodiments, process 600 can use a blend mode that mixes pixels from the user interface overlay with pixels from the underlying frame of the video content item in any suitable manner (e.g., a dissolve blend mode, a multiply blend mode, and/or any other suitable type of blend mode or combination of blend modes). As another more particular example, in some embodiments, process 600 can use any suitable function to mix pixels from the overlay with corresponding pixels from the underlying frame of the video content item. As a specific example, process 600 can select either a pixel from the overlay or the corresponding pixel from the underlying frame of the video content item at random. As another specific example, in some embodiments, process 600 can multiply values (e.g., RGB values, HSV values, opacity values, and/or any other suitable values) of corresponding pixels of the overlay and the underlying frame of the video content item. Note that, in some embodiments, any suitable mathematical function can be used to blend the pixel values. Additionally, note that, in instances where a user device uses a blend mode to render an overlay on a frame of the video content item, the user device can determine the content of the frame of the video content item in any suitable manner. For example, in some embodiments, the user device can access color information for the frame from the video content item transmitted from the server.

As another example, in some embodiments, process 600 can blend the user interface components with an underlying frame of the video content item by manipulating an opacity or transparency value associated with the user interface component. In some embodiments, process 600 can select a blend mode based on capabilities of the user device that is presenting the video content item. For example, in some embodiments, process 600 can determine that the user device does not have a capability to implement a blend mode based on any suitable information, such as a model of the user device, a version of a particular application executing on the mobile device to be used to render the video content item, a version of an operating system executing on the mobile device, and/or any other suitable information. As a more particular example, in instances where process 600 is operating on a particular model of user device (e.g., a particular brand or model of mobile phone, a particular brand or model of tablet computer, and/or any other suitable model of user device) that does not support blend modes other than a manipulation of opacity or transparency, process 600 can determine that the user interface component layer is to be blended with the underlying video content item layer by manipulating an opacity or transparency value of the user interface component layer. As a specific example, in some embodiments, process 600 can manipulate the opacity or transparency of the user interface component layer by setting an alpha value associated with the layer to be more or less transparent. In some embodiments, process 600 can select the blend mode based on any other suitable information, such as an operating system of the user device, a browser used to present the user interface in which the video content item is presented, a version of an application used to present the user interface in which the video content item is presented, and/or any other suitable information.

In some embodiments, process 600 can identify updated appearance parameters for the user interface on the color palette information at 608. Process 600 can identify the updated appearance parameters using any suitable technique or combination of techniques. For example, in some embodiments, process 600 can retrieve color palette information corresponding to a second portion of the video content item from the array of arrays or matrix by retrieving the information from a next index of the array or matrix.

At 610, process 600 can update the appearance of the user interface based on the updated appearance parameters identified at block 608 while continuing to present the video content item. For example, in some embodiments, process 600 can change colors of user interface components or sections, change contrast ratios of user interface components or sections, and/or modify an appearance of the user interface in any other suitable manner while continuing to present the video content item. In some embodiments, process 600 can continue to present the video content item by presenting a second portion of the video content item that corresponds to the updated parameters identified at block 608.

In some embodiments, at least some of the above described blocks of the processes of FIGS. 1 and 6 can be executed or performed in any order or sequence not limited to the order and sequence shown in and described in connection with the figure. Also, some of the above blocks of FIGS. 1 and 6 can be executed or performed substantially simultaneously where appropriate or in parallel to reduce latency and processing times. Additionally or alternatively, some of the above described blocks of the processes of FIGS. 1 and 6 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for modifying user interface colors in connection with the presentation of a video are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for modifying user interface colors, comprising:
   receiving, at a user device, video data corresponding to a video content item and color palette information corresponding to the video content item, wherein the color palette information indicates a plurality of colors each corresponding to a portion of the video content item from a plurality of portions of the video content item, and wherein each color of the plurality of colors indicates a color of an element of a user interface in which the video content item is to be presented on the user device;
   identifying a first color for the element of the user interface based on the color palette information, wherein the first color corresponds to a first portion of the video content item;
   determining whether the user device has a capability to blend the element with the first portion of the video content item;
   in response to determining that the user device does not have the capability to blend the element with the first portion of the video content item, applying a transparency value to the first portion of the video content item;
   causing the first portion of the video content item to be presented within the user interface, wherein the element of the user interface having the first color is presented;
   identifying a second color for the element of the user interface, wherein the second color corresponds to a second portion of the video content item; and
   modifying an appearance of the element of the user interface by changing the color of the element from the first color to the second color while presenting the second portion of the video content item.

2. The method of claim 1, wherein the element is an overlay graphic that is positioned to be presented over the presentation of the video content item within the user interface.

3. The method of claim 2, wherein the color palette information includes blending information that indicates a presentation mode in which the overlay graphic is to be presented in connection with the video content item.

4. The method of claim 1, wherein the color palette information includes contrast information that indicates a contrast ratio of text of the element of the user interface to a background color of the element of the user interface.

5. The method of claim 1, wherein the color palette information includes an idle color for the element of the user interface when the user interface is determined to be in an idle state and an active color for the element of the user interface when the user interface is determined to be in an active state.

6. A method for modifying user interface colors, comprising:
   receiving, at a user device, video data corresponding to a video content item and color palette information corresponding to the video content item, wherein the color palette information indicates a plurality of colors each corresponding to a portion of the video content item from a plurality of portions of the video content item, wherein each color of the plurality of colors indicates a color of an overlay graphic of a user interface in which the video content item is to be presented on the user device, and wherein the color palette information includes blending information that indicates a presentation mode in which the overlay graphic is to be presented in connection with the video content item;
   identifying a first color for the overlay graphic of the user interface based on the color palette information, wherein the first color corresponds to a first portion of the video content item;
   creating a composite first portion of the video content item by blending the overlay graphic with the first portion of the video content item using the blending information;
   causing the composite first portion of the video content item to be presented within the user interface;
   identifying a second color for the overlay graphic of the user interface, wherein the second color corresponds to a second portion of the video content item; and
   modifying an appearance of the overlay graphic of the user interface by changing the color of the overlay graphic from the first color to the second color while presenting the second portion of the video content item.

7. A system for modifying user interface colors, the system comprising:
   a hardware processor that is programmed to:
      receive, at a user device, video data corresponding to a video content item and color palette information corresponding to the video content item, wherein the color palette information indicates a plurality of colors each corresponding to a portion of the video content item from a plurality of portions of the video content item, and wherein each color of the plurality of colors indicates a color of an element of a user interface in which the video content item is to be presented on the user device;

identify a first color for the element of the user interface based on the color palette information, wherein the first color corresponds to a first portion of the video content item;

determine whether the user device has a capability to blend the element with the first portion of the video content item;

in response to determining that the user device does not have the capability to blend the element with the first portion of the video content item, apply a transparency value to the first portion of the video content item;

cause the first portion of the video content item to be presented within the user interface, wherein the element of the user interface having the first color is presented;

identify a second color for the element of the user interface, wherein the second color corresponds to a second portion of the video content item; and modify an appearance of the element of the user interface by changing the color of the element from the first color to the second color while presenting the second portion of the video content item.

8. The system of claim 7, wherein the element is an overlay graphic that is positioned to be presented over the presentation of the video content item within the user interface.

9. The system of claim 8, wherein the color palette information includes blending information that indicates a presentation mode in which the overlay graphic is to be presented in connection with the video content item.

10. The system of claim 7, wherein the color palette information includes contrast information that indicates a contrast ratio of text of the element of the user interface to a background color of the element of the user interface.

11. The system of claim 7, wherein the color palette information includes an idle color for the element of the user interface when the user interface is determined to be in an idle state and an active color for the element of the user interface when the user interface is determined to be in an active state.

12. A system for modifying user interface colors, the system comprising:

a hardware processor that is programmed to:

receive, at a user device, video data corresponding to a video content item and color palette information corresponding to the video content item, wherein the color palette information indicates a plurality of colors each corresponding to a portion of the video content item from a plurality of portions of the video content item, wherein each color of the plurality of colors indicates a color of an overlay graphic of a user interface in which the video content item is to be presented on the user device, and wherein the color palette information includes blending information that indicates a presentation mode in which the overlay graphic is to be presented in connection with the video content item;

identify a first color for the overlay graphic of the user interface based on the color palette information, wherein the first color corresponds to a first portion of the video content item;

create a composite first portion of the video content item by blending the overlay graphic with the first portion of the video content item using the blending information;

cause the composite first portion of the video content item to be presented within the user interface;

identify a second color for the overlay graphic of the user interface, wherein the second color corresponds to a second portion of the video content item; and modify an appearance of the overlay graphic of the user interface by changing the color of the overlay graphic from the first color to the second color while presenting the second portion of the video content item.

13. A non-transitory computer-readable medium containing computer executable instructions that, when executed by a processor, cause the processor to perform a method for modifying user interface colors, the method comprising:

receiving video data corresponding to a video content item and color palette information corresponding to the video content item, wherein the color palette information indicates a plurality of colors each corresponding to a portion of the video content item from a plurality of portions of the video content item, and wherein each color of the plurality of colors indicates a color of an element of a user interface in which the video content item is to be presented on a user device;

identifying a first color for the element of the user interface based on the color palette information, wherein the first color corresponds to a first portion of the video content item;

determining whether the user device has a capability to blend the element with the first portion of the video content item;

in response to determining that the user device does not have the capability to blend the element with the first portion of the video content item, applying a transparency value to the first portion of the video content item;

causing the first portion of the video content item to be presented within the user interface, wherein the element of the user interface having the first color is presented;

identifying a second color for the element of the user interface, wherein the second color corresponds to a second portion of the video content item; and modifying an appearance of the element of the user interface by changing the color of the element from the first color to the second color while presenting the second portion of the video content item.

14. The non-transitory computer-readable medium of claim 13, wherein the element is an overlay graphic that is positioned to be presented over the presentation of the video content item within the user interface.

15. The non-transitory computer-readable medium of claim 14, wherein the color palette information includes blending information that indicates a presentation mode in which the overlay graphic is to be presented in connection with the video content item.

16. The non-transitory computer-readable medium of claim 13, wherein the color palette information includes contrast information that indicates a contrast ratio of text of the element of the user interface to a background color of the element of the user interface.

17. The non-transitory computer-readable medium of claim 13, wherein the color palette information includes an idle color for the element of the user interface when the user interface is determined to be in an idle state and an active color for the element of the user interface when the user interface is determined to be in an active state.

18. A non-transitory computer-readable medium containing computer executable instructions that, when executed by a processor, cause the processor to perform a method for modifying user interface colors, the method comprising:

receiving video data corresponding to a video content item and color palette information corresponding to the video content item, wherein the color palette information indicates a plurality of colors each corresponding to a portion of the video content item from a plurality of portions of the video content item, wherein each color of the plurality of colors indicates a color of an overlay graphic of a user interface in which the video content item is to be presented, and wherein the color palette information includes blending information that indicates a presentation mode in which the overlay graphic is to be presented in connection with the video content item;

identifying a first color for the overlay graphic of the user interface based on the color palette information, wherein the first color corresponds to a first portion of the video content item;

creating a composite first portion of the video content item by blending the overlay graphic with the first portion of the video content item using the blending information;

causing the composite first portion of the video content item to be presented within the user interface;

identifying a second color for the overlay graphic of the user interface, wherein the second color corresponds to a second portion of the video content item; and modifying an appearance of the overlay graphic of the user interface by changing the color of the overlay graphic from the first color to the second color while presenting the second portion of the video content item.

* * * * *